United States Patent [19]

Simon

[11] 4,042,544

[45] Aug. 16, 1977

[54] CHROMATED POLYAMIDE RESINS AS CURING AGENTS FOR EPOXY RESINS, AND THEIR CURED CORROSION-RESISTANT REACTION PRODUCTS

[76] Inventor: Eli Simon, 7175 Little Harbor Drive, Huntington Beach, Calif. 92648

[21] Appl. No.: 675,066

[22] Filed: Apr. 8, 1976

[51] Int. Cl.² ............................................. C08G 69/26
[52] U.S. Cl. ........................... 260/18 PN; 260/18 N; 260/47 EN; 260/830 P; 260/438.5 R; 260/404.5
[58] Field of Search ............... 260/404.5 PA, 438.5 R, 260/18 N, 18 PN, 830 P, 47 EN

[56] References Cited

U.S. PATENT DOCUMENTS

| | | | |
|---|---|---|---|
| 3,159,499 | 12/1964 | Jorda | 260/18 PN |
| 3,451,865 | 6/1969 | Bretz | 260/29.2 M |
| 3,759,751 | 9/1973 | Smith | 260/37 EP |
| 3,954,482 | 5/1976 | Novack | 260/37 M |
| 3,956,241 | 5/1976 | Steele et al. | 260/47 EC |

Primary Examiner—Eugene C. Rzucidlo

[57] ABSTRACT

This invention relates to products formed by reacting an aqueous solution of chromium trioxide with fluid reactive polyamide resins that are useful and novel as co-reactants or curing agents for epoxy resins, having characteristics of accelerating the curing rate, of increasing the toughness of the cured product, and of providing intrinsic or self-contained corrosion-inhibiting properties.

The reactive polyamide resins are identified as condensation products of polyfunctional polyalkylamines and a polyene fatty acid to form higher molecular weight materials which contain both aliphatic amine and amide functional groups.

3 Claims, No Drawings

CHROMATED POLYAMIDE RESINS AS CURING AGENTS FOR EPOXY RESINS, AND THEIR CURED CORROSION-RESISTANT REACTION PRODUCTS

BACKGROUND AND PRIOR ART

The versatility of the reactive polyamide resins as hardeners for the solid, liquid, and modified epoxies which contain epoxy or oxirane rings on terminal positions is well known. However, to protect corrosion-susceptible metal substrates such as those of the aluminum and ferrous alloys, corrosion inhibitors must be added to the hardener/epoxy mixture, particularly when exposure to humid and saline atmospheres is involved; this presents practical problems and limitations to the usefulness of the conventional polyamide/epoxy system by requiring grind of the pigment for incorporation in the epoxy as a vehicle, its concomitant settling and phase separation because of the wide differences in specific gravity between it and the resin vehicle, and the general lack of applicability as a faying surface adhesive and sealant in the weld-bonding of structural elements.

It is an object of this invention to retain or improve the characteristics of the reactive polyamide/epoxy products while circumventing the requirement of adding pigments for corrosion protection to corrosion-susceptible metal substrates.

SUMMARY OF THE INVENTION

This invention discloses reaction products of aqueous chromium trioxide with fluid reactive polyamides, that have amine values between 230–400, that are novel and useful as corrosion-inhibiting curing agents for epoxy resins. The thermoset polymers have applications as coatings, adhesives, sealants and caulking compounds, and are intrinsically corrosion inhibiting, protecting metal substrates when exposed to humid and/or saline atmospheres. Representative of the reactive polyamides are the VERSAMIDS of General Mills Chemicals, Inc., and the EMEREZ products of Emery Industries, Inc.; these are further described in U.S. Pat. Nos. 3,139,437 and 3,157,607.

DESCRIPTION OF THE INVENTION

The epoxy coreactants of this invention comprise reaction products between 2 to 4 amine value equivalents of fluid reactive polyamides per mol of chromium trioxide. The amine value of the reactive polyamides is determined by non-aqueous potentiometric titration and is defined as the milligrams of KOH equivalent to the amine alkalinity in one gram of sample. Illustrative of the fluid reactive polyamides and their ratios with chromium trioxide are the following: for the General Mills Chemicals reactive polyamides, 476 to 952 g. Versamid 115(amine value 238) per mol chromium trioxide, and 690 to 1380 g. Versamid 125(amine value 345) per mol chromium trioxide, and 770 to 1540 g. Versamid 140(amine value 385) per mol chromium trioxide; and for Emery Industries reactive polyamides, 476 to 952 g. Emerez 1511(amine value avg., 238), 690 to 1380 g. Emerez 1512(amine value avg., 345), and 750 to 1500 g. Emerez 1514(amine value avg., 375), each based on one mol of chromium trioxide.

The reaction between the reactive polyamide and chromium trioxide is readily accomplished at approximately ambient temperature by adding an aqueous solution of chromium trioxide to the polyamide and mixing by a kneading type of motion to form a thickened, homogeneous, grease-like product. As the reaction is mildly exothermic, if mixing is done by roller-milling, the rolls would be water-cooled, or if the masses of reactants are such as to elevate the temperature in excess of approximately 50° C., cooling should be provided. An excess of water, beyond the stoichiometry of 1-mol $CrO_3$: 1-mol$H_2O$ is used, varying from about 5 to 75 times the theoretical requirement for $H_2CrO_4$. The following procedure is representative of the preparation sequence:

2 Amine Values Reactive Polyamide: mol $CrO_3$: 25 moles $H_2O$

Proportional aliquots of 100g.$CrO_3$(1-mol):450 g. distilled $H_2O$ (25 moles):770 g. Versamid 140(2 amine values) were taken. The $CrO_3$ was predissolved in the water and the aqueous solution was spatula-mixed with the Versamid 140 for approximately 5 minutes at ambient temperature, forming a thickened, homogeneous, paste-like product resembling a grease.

4 Amine Values Reactive Polyamide: mol $CrO_3$: 50 moles $H_2O$ — the $CrO_3$ was reduced to one-half mol(or 50 g.) for the same weights of the other components, ie., 450 g. $H_2O$, and 750 g. Versamid 140.

2 Amine Values Reactive Polyamide: mol $CrO_3$: 5 moles $H_2O$ — the water was reduced to 5 moles while maintaining the 1-mol of $CrO_3$ and the 2 amine values of the reactive polyamide.

The working "life" of the reaction products of this invention is dependent on the quantity of water used in excess of the stoichiometric requirement; thus, for 2 amine values of reactive polyamide: 1 -mol $CrO_3$, using 5 moles of water limits the practical applicability of the chromated polyamide to within about eight hours, whereas increasing the water to 25–50 moles greatly extends the viscosity stability of the chromated product. Surprisingly, the excess water had no apparent adverse effect on the physical characteristics of the epoxy-cured polymers. It is apparent that on-site mixing and use may also be resorted to advantageously, particularly by reason of the ease and rapidity of incorporation; in this case, the aqueous chromium trioxide and reactive polyamide would be packaged separately.

EXAMPLES OF THE INVENTION

EXAMPLE 1

"Corrosion Inhibition of Chromated Polyamide/Epoxy"

1. Chromated polyamide was prepared by reacting proportional aliquots of 2-amine values of Versamid 140: 1-mol $CrO_3$: 25 moles $H_2O$ as noted under the section "Description of the Invention".

2. In addition, to obtain a stabilized reaction product, it was aged for several days in a closed system at ambient temperature, washed with running water to remove "uncombined" chromic acid, given a final rinse with repeated portions of distilled water, and dried at 38° C; test of a hot water extract for chromate ion was positive.

3. Three test samples were prepared to obtain information on the effects of the chromated polyamide when used as a co-reactant with epoxy resins: in each of the cases (a, b, and c), proportional aliquots were taken.

|  | (a) | (b) | (c)-Control |
|---|---|---|---|
| Chromated Versamid 140 (2-amine values Versamid 140 plus 1-mol $CrO_3 \cdot H_2O$) | 888 g. | 888 g. | — |
| Shell Epon 826 (liquid diglycidyl ether of bisphenol A, having an epoxy equivalent of 180–188) | 368 g. | 184 g. | 368 g. |
| Versamid 140 (amine value, 385) | — | — | 385 g. |

After mixing, samples (a) and (b) were non-sagging, whereas the Control was still fluid. After 24 hours at ambient temperature, both (a) and (b) were tack-free, hard, tough and flexible and gave positive chromate ion tests from hot distilled water extracts; (c) had hardened but retained residual surface tack. After an additional cure of 1 hour at 66° C., (a) & (b) had increased in toughness, remained flexible and adherent and gave positive chromate ion tests from hot distilled water extracts; (c) had increased in hardness, but still retained surface tack. After an additional cure of 2 hours at 177° C., all were hard, tough, adherent, flexible and tack-free.

Samples (a), (b), and (c) were applied to one face of solvent-cleaned, bare 7075-T6 aluminum alloy substrates, and after curing for 24 hours at ambient conditions plus 1 hour at 66° C., they were partially immersed in a salt solution containing 3 g. sodium chloride in 100 ml. tap water. The substrate coated with the Control mixture was rapidly attacked and showed extensive corrosion after 24 hours, whereas samples (a) and (b) were unchanged. After 1 year, approximately ½ of the saline solution of the Control was filled with the products of corrosion, primarily hydrated oxides of aluminum; in contrast, the exposed metal of samples (a) and (b) remained bright with little evidence of corrosive attack.

EXAMPLE 2

"Comparison, Ratio of Chromated Reactive Polyamide:Epoxy"

Reaction products of proportional aliquots of 2-amine values Versamid 140:1-mol $CrO_3$: 25 moles $H_2O$ (call Type I), and 4-amine values Versamid 140: 1-mol $CrO_3$:50 moles $H_2O$ (call Type II) were prepared by predissolving the chromium trioxide in the water and mixing the aqueous chromic acid solution with the reactive polyamide for approximately 5 minutes, as previously noted under the section "Description of the Invention" and Example 1. In the table following, proportional aliquots of these and Shell Epon 826 were mixed or co-reacted; Controls of neat Versamid 140/Epon 826 at equivalent ratios were included. The tests comprised comparison of the physical properties and chromate ion availability, where applicable, after various cure conditions.

| Component | Test Mixtures (grams) | | | | | | | | |
|---|---|---|---|---|---|---|---|---|---|
|  | 1 | 2 | 3 | 4 | 5 | 6 | 7 | 8 | 9 |
| 2-amine values Versamid 140:1-mol $CrO_3$:25 moles $H_2O$ (Type I) | 888 | 1776 | 888 | — | — | — | — | — | — |
| 4-amine values Versamid 140:1-mol $CrO_3$:50 moles $H_2O$ (Type II) | — | — | — | 1658 | 3316 | 1658 | — | — | — |
| Epon 826 (epoxy equivalent, 184, avg.) | 368 | 368 | 736 | 368 | 368 | 736 | 368 | 368 | 736 |
| Versamid 140 | — | — | — | — | — | — | 770 | 1540 | 770 |

On an approximate mol ratio: sample-1 comprises 1 mol Type I/mol Epon 826; sample-2, 2 moles Type I/mol Epon 826; sample-3, 1 mol Type I/2 moles Epon 826; sample-4, 1 mol Type II/mol Epon 826; sample-5, 2 moles Type II per mol Epon 826; sample-6, 1 mol Type II/2 moles Epon 826; samples 7, 8, and 9 are Controls with varying ratios of neat Versamid 140/Epon 826.

The physical properties and chromate ion availability were noted and compared after each of the following conditions of cure: 2-hours at 66° C; plus 1-hour at 93° C; plus 1-hour at 121° C; plus 1-hour at 177° C; and plus 1-hour at 204° C. Samples 1–6 inclusive were tack-free after 2-hours at 66° C., and continued to improve in toughness and hardness after the extended cure conditions; chromate ion availability from a hot distilled water extract remained positive after the 121° C. exposure, but was negative after the 177° C. cure. Control samples 7 and 8 required cure temperatures in excess of the 2-hours at 66° C. to become tack-free, or 121° C., and 177° C., respectively. Control sample 9 was an improvement over Controls 7 & 8, and most closely matched chromated sample number 3; however it remained softer and less tough than No. 3 after each of the cure conditions.

The results indicate that the chromated reactive polyamide does not adversely affect the curing rate or the physical properties when used as a co-reactant with epoxy resins, and in fact improves the toughness and low temperature hardening reaction; additionally, chromate ion availability by water leach should be positive for temperature exposures up to approximately 121° C.

EXAMPLE 3

"Chromated Reactive Polyamide/Epoxy Adhesive Test"

A lap shear specimen was prepared using test mixture No. 1 of Example 2. After curing for 1 hour at 66° C. plus one hour at 93° C., it was stressed to failure at room temperature; the functional characteristics, as an adhesive, were very good, based on the load required and the nature of the failure which was mixed cohesive-/adhesive.

EXAMPLE 4

"On-Site Preparation And Use Of The Chromated Reactive Polyamide"

In this example, the ratio of 2-amine values of Versamid 140(770 g.): 1-mol $CrO_3$(100 g.) was used; the amount of water as solvent was approximately five times that of the stoichiometric ratio of 1-mol $CrO_3$:1-mol $H_2O$, or 90 ml. $H_2O$:100 g. $CrO_3$. The aqueous solution of chromium trioxide was mixed with the Versamid 140 for about one minute resulting in a uniform, grease-like, thickened paste, and after aging at ambient for about five minutes, the total weight of the aqueous chromated reactive polyamide was mixed with Shell Epon 826 in a ratio of 368 g. Epon 826(2 oxirane equivalents) to the 2-amine values of the original Versamid 140(or 770 g.); the following additional information is illustrative.

Component I

Versamid 140 — 7.70 g. (1/100 th of 2-amine values)

Component II $CrO_3$— 1.00 g. (1/100 th mol)
$H_2O$ — 0.90 ml. (1/100 th of 5 moles)

Component III

Epon 826 — 3.68 g. (1/100 th of 2-oxirane equivalents)

Component II was reacted with Component I, as previously noted, after which its total weight (9.60 g. theor.) was mixed with the 3.68 g. of Shell Epon 826(Component III).

After curing overnight at ambient temperature, both thin and thick deposits were tack-free, tough, flexible and adherent to the aluminum substrate; an additional cure of 1 hour at 100° C. increased the toughness without impairing either the flexibility or the adhesion.

EXAMPLE 5

"Chromated Versamid 125/Ciba-Geigy's Epoxy 2826"

In this example, reactive polyamide Versamid 125 of General Mills Chemicals, Inc., was prereacted with an aqueous solution of chromium trioxide which contained 25 times the stoichiometric ratio of 1-mol $CrO_3$:1-mol $H_2O$, and the reaction product was used as a curing agent for a Ciba-Geigy difunctional epoxy resin which is based on hydantoin and bisphenol A. The following information is illustrative:

Component I

Versamid 125(amine value, 345) — 690 g., or 2-amine values

Component II $CrO_3$, 1-mol, or 100 g.
$H_2O$, 25 moles, or 450 g.

Component III

Ciba-Geigy's XB 2826(epoxy weight/epoxide, 161) — 322 g.(2 epoxide equivalents)

For test purposes, 1/100 th of each of the quantities was taken for Components I, II, and III. Thus, the aqueous solution of 1.00 g. $CrO_3$ and 4.50 g. $H_2O$ was reacted with 6.90 g. Versamid 125 by spatula-mixing for about five minutes; 3.22 g. XB 2826 epoxy was added and uniformly mixed. After 6 hours exposure at ambient temperature, the chromated reactive polyamide/epoxy was tack-free, flexible, and very adherent to an aluminum substrate; curing was continued at ambient temperature, and after 24 hours, both thin and thick deposits had increased in hardness and toughness, maintaining excellent flexibility and adhesion.

I claim:

1. Curing agents for epoxy resins which are prepared at a temperature not to exceed 50° C by mechanically mixing for about 5 minutes an aqueous solution of 1 mole of chromium trioxide to 5–75 moles water with 2–4 amine values of a fluid reactive polyamide having an amine value of between 230–400.

2. A corrosion-resistant reaction product of the curing agent of claim 1 and epoxy resin.

3. A corrosion-resistant reaction product of 1 mole of the curing agent of claim 1 in which the molar value of the curing agent is calculated as an addition product between $CrO_3.H_2O$ and 2–4 amine values of the said fluid reactive polyamide and ½ to 2 moles of liquid polyglycidyl ether of bisphenol A.

* * * * *